United States Patent [19]

Kato et al.

[11] Patent Number: 5,561,538

[45] Date of Patent: Oct. 1, 1996

[54] DIRECT-VIEW DISPLAY APPARATUS

[75] Inventors: Hiromi Kato; Hiroshi Hamada, both of Nara, Japan

[73] Assignee: Sharp Kabushiki Kaisha, Osaka, Japan

[21] Appl. No.: 152,708

[22] Filed: Nov. 16, 1993

[30] Foreign Application Priority Data

| Nov. 17, 1992 | [JP] | Japan | 4-305764 |
| Apr. 30, 1993 | [JP] | Japan | 5-104498 |
| Jul. 6, 1993 | [JP] | Japan | 5-166973 |

[51] Int. Cl.$^6$ ............ G02F 1/1335; G02B 21/22
[52] U.S. Cl. ............ 359/40; 359/41; 359/48; 359/377
[58] Field of Search ............ 359/40, 41, 377, 359/48; 350/602

[56] References Cited

U.S. PATENT DOCUMENTS

| 4,575,722 | 5/1986  | Anderson        | 359/377 |
| 4,732,456 | 3/1988  | Fergason et al. | 359/40  |
| 4,761,056 | 8/1988  | Evans et al.    | 350/602 |
| 4,790,632 | 12/1988 | Miyakawa et al. | 359/40  |
| 5,052,783 | 10/1991 | Hamada          | 359/40  |

FOREIGN PATENT DOCUMENTS

| 366462    | 10/1989 | European Pat. Off. . |
| 425266    | 10/1990 | European Pat. Off. . |
| 428971    | 11/1990 | European Pat. Off. . |
| 478802    | 4/1991  | European Pat. Off. . |
| 507599    | 4/1992  | European Pat. Off. . |
| 60-241024 | 11/1985 | Japan . |
| 63-62748  | 12/1988 | Japan . |
| 64-35415  | 2/1989  | Japan . |
| 1-281426  | 11/1989 | Japan . |

*Primary Examiner*—Wael Fahmy
*Assistant Examiner*—Fetsum Abraham

[57] ABSTRACT

A direct-view display apparatus provides improved image quality by preventing the formation of a stripe pattern caused by parallax effects. A liquid-crystal panel for active matrix driving is disposed. A microlens array consisting of a plurality of microlenses formed in corresponding relationship to each pixel in the liquid-crystal panel is placed on a surface of a substrate of the liquid-crystal panel. A field lens and an eyepiece are disposed in this order between the microlens array and an observer. The field lens serves to converge the principal rays emerging from the microlens array in parallel with an optical axis onto the eyepiece, so that a moire pattern caused by parallax effects can be prevented from being formed and the image quality can thus be improved. Light from backlights are passed through display panels, respectively consisting of liquid-crystal cells, microlens arrays, and field lenses, and are superimposed by a crossed dichroic prism. The observer views the light superimposed by the crossed dichroic prism, i.e. a color image, through an eyepiece.

19 Claims, 6 Drawing Sheets

DIRECT-VIEW DISPLAY APPARATUS

BACKGROUND OF THE INVENTION

1. Field of the Invention

The present invention relates to a direct-view display apparatus, and more particularly to a direct-view display apparatus that is suitable for use as display means such as a viewfinder for a video camera or a head-mounted display for a virtual reality system.

2. Description of the Related Art

The display panel used in the invention is an optically transmissive display panel that does not emit light by itself but that displays images and characters by modulating the intensity of the light emitted from a separately provided light source, the transmissivity of the panel being varied by the application of a drive signal. Examples of this type of display include liquid-crystal display panels, electrochromic displays, and displays utilizing light-transmitting ceramics such as PLZT; among others, liquid-crystal display panels are extensively used in portable televisions, word processors, projectors, etc.

To realize full color display on portable televisions, word processors or the like with such a liquid-crystal display panel, red, green, and blue color filters are provided, each aligned with a pixel in the display panel. In the case of a viewfinder for a video camera and a head-mounted display for a virtual reality system also, similar color filters are provided to produce full color display.

The liquid-crystal panel contains pixel electrodes that are arranged orderly in a matrix pattern. An independent driving voltage is applied to each individual pixel electrode, thereby changing the optical properties of the crystal and thus producing images and characters on the display. There are two basic methods of applying an independent driving voltage to each pixel electrode: one is the direct-matrix system, and the other is the active-matrix system that utilizes nonlinear two-terminal devices or three-terminal devices. Specifically, in the latter system, since it is necessary to provide switching devices, such as MIM (metal-insulator-metal) devices or TFT (thin-film transistor) devices, plus bus electrodes for transferring the driving voltage to the pixel electrodes, the aperture ratio, expressed as the ratio of the effective pixel aperture (light passing area) 52 to the total area of the pixel 51, is reduced as shown in FIG. 11. Furthermore, since the normal driving voltage is not applied to the liquid crystal in areas where the switching devices and bus electrodes are formed, the liquid crystal in those areas does not function to produce the intended display. Therefore, a light-blocking means called a black matrix is provided over the areas indicated by oblique hatching in FIG. 11, so that the light passing through these areas is blocked by the light-blocking means. In such a liquid-crystal display panel, the light-blocking areas covered with the black matrix are observed as a stripe pattern.

When employing the above-described active-matrix driving system in a direct-view display apparatus such as a viewfinder for a video camera or a head-mounted display for a virtual reality system, it is required to form pixel electrodes, switching devices, and bus electrodes at high density within a restricted area. However, it is difficult to form the switching devices and bus electrodes smaller than a certain size because of constraints in terms of their electrical performance and manufacturing technology. This causes the problem that as the pixel pitch is made smaller, the aperture ratio is reduced and the display becomes darker, making the light-blocking stripe pattern due to the black matrix more noticeable and thus resulting in significant degradation of the picture quality.

To solve the problem caused by the reduction of the aperture ratio, there is proposed an approach that involves placing a microlens on each pixel of the display panel to magnify the light exiting each pixel electrode up to the size of the pixel. For example, Japanese Unexamined Patent Publication (KOKAI) No. JP-A 64-35415 (1989) discloses an example in which a light valve used in a projector or the like is realized by using a telecentric optical system, in combination with meniscus microlenses, for converting a beam of parallel light into a magnified beam of parallel light. On the other hand, there is disclosed, in Japanese Examined Patent Publication (KOKOKU) No. JP-B2 63-62748 (1988), an example in which the above approach is taken in the construction of a segment-type direct-view display.

As described above, for full color display, red, green, and blue color filters are provided, each aligned with a pixel in the display panel, and a full-color picture is displayed by various combinations of the three differently colored pixels. However, in the case of a direct-view display such as a viewfinder and a head-mounted display, the display panel is viewed from such a short distance that the size of each of the pixels is larger than the size recognized by the resolution of the observer's eye. This results in reduced smoothness of the produced image, and hence, degradation in image quality. Among others, in the case of a head-mounted display for a virtual reality system, the image quality degradation is particularly pronounced since the observer views a magnified image. This causes a serious problem when creating a virtual space.

Furthermore, in the direct-view display used as a viewfinder for a video camera or a head-mounted display for a virtual reality system, since the eyepiece is placed near the display panel, parallax in horizontal and vertical directions on the display panel becomes greater. Therefore, if microlenses such as described above are used, an optical displacement will occur between the microlens pitch and the pixel pitch of the display panel, which causes the emergent light from the display panel to pass off the center of each microlens and, as a result, produces a stripe pattern, generally known as a moire pattern, degrading image quality significantly.

Considering this problem, the aforementioned Japanese Unexamined Patent Publication (KOKAI) No. JP-A 64-35415 (1989) employs a telecentric optical system and uses collimated light to illuminate the display panel. However, for applications such as a viewfinder and a head-mounted display, compactness is also an important consideration, but it is difficult to produce rays of highly collimated light having uniform luminous distribution within a relatively restricted space. This makes is imperative to use a diffused light source such as a fluorescent lamp, which however causes image quality degradation due to moire patterns, as described above, and the effect such as described in the above Publication cannot be expected. On the other hand, the display disclosed in the aforementioned Japanese Examined Patent Publication (KOKOKU) No. JP-B2 63-62748 (1988) is not specifically designed for applications requiring placing the eyepiece near the display panel; therefore, when the display is used as a viewfinder or a head-mounted display, image quality degradation will occur due to moire patterns as described above.

SUMMARY OF THE INVENTION

It is an object of the invention to provide a direct-view display apparatus capable of producing a full-color display of high image quality without degrading image quality and without causing stripe patterns due to parallax.

The invention provides a direct-view display apparatus comprising:

an optically transmissive display panel containing a plurality of pixels, arranged in a matrix array, for controlling light passing therethrough;

a light source for illuminating the display panel; and an eyepiece through which to view the image formed on the display panel, a plurality of microlenses being placed on the surface of the display panel facing the eyepiece, each microlens being aligned with each individual pixel in the display panel.

The direct-view display apparatus is also characterized in that, when the distance between the surface of the display panel on which the pixels are arranged and the surface thereof on which the microlenses are arranged is denoted by t, the distance between a virtual image of an observer's pupil, when looked through the eyepiece from the display panel side, and the surface of the display panel on which the pixels are arranged, is denoted by L1, the refractive index of a substrate of the display panel is denoted by n, the pixel pitch of the display panel is denoted by P0, and the pitch of the microlenses is denoted by P1, then the microlens pitch P1 is given as $P1=P0\cdot\{1-t/(n\cdot L1)\}$.

The invention also provides a direct-view display apparatus comprising;

an optically transmissive display panel containing a plurality of pixels, arranged in a matrix array, for controlling light passing therethrough;

a light source for illuminating the display panel; and an eyepiece through which to view the image formed on the display panel, a plurality of microlenses being placed on the surface of the display panel facing the eyepiece, each microlens being aligned with each individual pixel in the display panel, and a field lens being placed on the eyepiece side of the microlenses, the field lens having the function of converging the principal rays passed through the microlenses in parallel with an optical axis onto the eyepiece.

According to the invention, microlenses are arranged on the display panel surface facing the eyepiece. The display panel contains a plurality of pixels, arranged in a matrix array, for controlling the light passing therethrough, and forms an image thereon by selectively controlling the light radiated from the light source. The microlenses are arranged in corresponding relationship to the plurality of pixels; therefore, the light exiting each pixel electrode is magnified to the size of the pixel such that the edges of the light just meet the edges of the light exiting from its adjacent pixel electrodes, producing a bright and uniform contrast display free from stripe patterns and thus achieving improved image quality.

The pitch P1 of the microlenses is given as $P1=P0\cdot\{1-t/(n\cdot L1)\}$, where P0 is the pixel pitch of the display panel, and t is the distance between the display panel surface on which the pixels are arranged and the surface on which the microlenses are arranged. Also, n is the refractive index of the substrate of the display panel, and L1 is the distance between the virtual image of the observer's pupil, when looked through the eyepiece from the display panel side, and the display panel surface on which the pixels are arranged. With this arrangement, the edges of the light exiting the plurality of pixel electrodes just meet each other, with the light passing through the centers of their associated microlenses; this serves to prevent the formation of moire patterns due to parallax effects between the display panel and the microlenses and improve the image quality.

Furthermore, according to the invention, microlenses are arranged on the display panel surface facing the eyepiece, and a field lens is placed on the eyepiece side of the microlenses. The display panel contains a plurality of pixels, arranged in a matrix array, for controlling the light passing therethrough, and forms an image thereon by selectively controlling the light radiated from the light source. The microlenses are arranged in corresponding relationship to the plurality of pixels. On the other hand, the field lens converges the principal rays emerging from the microlenses in parallel with the optical axis onto the eyepiece. As a result, the light exiting each pixel electrode is magnified to the size of the pixel such that the edges of the light just meet the edges of the light exiting its adjacent pixel electrodes, thus producing a bright and uniform contrast display. Furthermore, since, of the light emerging from the microlenses, only the light with parallel or nearly parallel components is allowed to reach the observer's eye through the eyepiece, there is no need to use a collimated light source such as provided in the previously mentioned Japanese Unexamined Patent Publication (KOKAI) No. JP-A 64-35415 (1989), and an image of good quality free from moire patterns can be obtained even when a diffused light source is used, for example. Specifically, when the invention is applied to a liquid-crystal display, a display of good image quality with uniform contrast ratio can be realized.

As described above, according to the invention, the microlenses are arranged on the display panel surface facing the eyepiece. Accordingly, the light exiting a pixel electrode formed on each of the plurality of pixels in the display panel is magnified such that the edges of the light just meet the edges of the light exiting is adjacent pixel electrodes, thus producing a bright and uniform contrast display. Furthermore, the pitch of the arranged microlenses is corrected so that the light exiting the display panel passes through the centers of the microlenses. This provides the above-described effect, and serves to prevent the formation of moire patterns due to parallax effects and thus achieves improved image quality.

Furthermore, according to the invention, microlenses are arranged on the display panel surface facing the eyepiece, and a field lens is placed on the eyepiece side of the microlenses. Accordingly, the light exiting a pixel electrode formed on each of the plurality of pixels in the display panel is magnified such that the edges of the light just meet the edges of the light exiting its adjacent pixel electrodes, thus producing a bright and uniform contrast display while achieving improved image quality free from moire patterns caused by parallax effects.

The invention provides a direct-view display apparatus comprising:

a plurality of optically transmissive display panels;

a plurality of light sources for illuminating the plurality of display panels, respectively, with differently colored lights;

superimposing means for optically superimposing the images formed on the plurality of display panels; and an eyepiece through which to view an image superimposed by the superimposing means.

The invention is characterized in that the display panels each include a display cell in which a plurality of pixels for controlling light passing therethrough are arranged in a matrix array, and microlenses that are arranged in corresponding relationship to the plurality of pixels, the microlenses being arranged on the surface of the display cell facing the superimposing means.

The invention is also characterized in that, when the distance between the surface of the display cell on which the pixels are arranged and the surface thereof on which the microlenses are arranged is denoted by t, the distance between the surface of the display cell on which the pixels are arranged and an virtual image of an observer's pupil, when looked through the eyepiece from the display cell side, is denoted by L1, the refractive index of a substrate of the display cell is denoted by n, the pixel pitch of the display cell is denoted by P0, and the pitch of the microlenses is denoted by P1, then the microlens pitch P1 is given as $P1=P0\cdot\{1-t/(n\cdot L1)\}$.

Furthermore, the invention is characterized in that the display panels each include a display cell in which a plurality of pixels for controlling light passing therethrough are arranged in a matrix array, microlenses that are arranged in corresponding relationship to the plurality of pixels, and a field lens for converging the principal rays passed through the microlenses in parallel with an optical axis onto the eyepiece, the microlenses being arranged on the surface of the display cell facing the superimposing means, the field lens being placed between the microlens arrangement and the superimposing means.

According to the invention, the plurality of optically transmissive display panels are respectively illuminated by the plurality of light sources, to produce images thereon. The images produced on the plurality of display panels are superimposed optically by the superimposing means, and the superimposed image is viewed through the eyepiece.

Therefore, by using light sources for radiating red, green, and blue colored lights, respectively, and display panels arranged in corresponding relationship to the respective light sources, images are formed on the display panels and are then superimposed to produce a color display. Unlike a color display realized by placing red, green, and blue color filters on a single display panel, individual pixels colored by color filters are not discernible as individually colored pixels, and a high resolution color display can be obtained even when the apparatus is used for applications requiring viewing the display panel at a short distance, such as in a viewfinder for a video camera or a head-mounted display for a virtual reality system.

According to the invention, the display panels each include a display cell and microlenses. The display cell contains a plurality of pixels, arranged in a matrix array, for controlling light passing therethrough. The microlenses are arranged on the display cell surface facing the superimposing means, in corresponding relationship to the plurality of pixels. Each microlens magnifies the light exiting its associated pixel electrode up to the size of the pixel.

A high resolution color display can thus be obtained, and further, the light exiting each pixel electrode is magnified to the size of the pixel so that the edges of the light just meet the edges of the light exiting its adjacent pixel electrodes, producing a bright and uniform contrast display free from stripe patterns, and thus achieving improved image quality.

Furthermore, according to the invention, the pitch P1 of the microlenses is given as $P1=P0\cdot\{1-t/(n\cdot L1)\}$, where P0 denotes the pixel pitch of the display cell, t denotes the distance between the display cell surface on which the pixels are arranged and the surface on which the microlenses are arranged, n denotes the refractive index of the substrate of the display cell, and L1 denotes the distance between the display cell surface on which the pixels are arranged, and the virtual image of the observer's pupil, when looked through the eyepiece from the display cell side.

With this arrangement, the edges of the light exiting the plurality of pixel electrodes just meet each other, with the light passing through the centers of their associated microlenses; this serves to prevent the formation of moire patterns due to parallax effects between the display cell and the microlenses, and achieves a bright and uniform contrast color display with improved image quality.

Furthermore, according to the invention, the display panels each include a display cell and microlenses. The display cell contains a plurality of pixels, arranged in a matrix array, for controlling light passing therethrough. The microlenses are arranged on the surface of the display cell facing the superimposing means, in corresponding relationship to the plurality of pixels in the display cell. The field lens is placed between the microlens arrangement and the superimposing means, and serves to converge the principal rays passed through the microlenses in parallel with the optical axis onto the eyepiece.

A high resolution color display can thus be obtained, and further, the light exiting each pixel electrode is magnified to the size of the pixel so that the edges of the light just meet the edges of the light exiting its adjacent pixel electrodes, thus producing a bright and uniform contrast display free from stripe patterns. Furthermore, since, of the light emerging from the microlenses, only the light with components parallel or nearly parallel to the optical axis is viewed through the eyepiece, there is no need to use a collimated light source such as provided in the previously mentioned Japanese Unexamined Patent Publication (KOKAI) No. JP-A 64-35415 (1989), and an image of good quality free from moire patterns can be obtained even when a diffused light source is used, for example. Specifically, when the invention is applied to a direct-view display using liquid crystal, dependence on the viewing angle is improved and a display with improved image quality can be obtained.

As described, according to the invention, the differently colored images formed on the plurality of display panels are superimposed optically by the superimposing means for viewing. Accordingly, unlike a display realized with color filters, the colored pixels are not individually discernible, and a high resolution color display can be obtained even when the apparatus is used as display means requiring viewing the display panel at a short distance.

According to the invention, the display panels each include a display cell and microlenses. Each microlens magnifies the light exiting its associated pixel electrode in the display cell up to the size of the pixel, so that the edges of the emergent light just meet the edges of the light exiting its adjacent pixel electrodes, which prevents the formation of stripe patterns. This ensures the production of a bright and uniform contrast color display with improved image quality.

Furthermore, according to the invention, the microlens pitch P1 is adjusted so that the lights exiting the plurality of pixel electrodes pass through the centers of their associated microlenses. This prevents the formation of moire patterns due to the parallax caused by the distance between the display cell and the microlens arrangement, and thus enhances the image quality.

According to the invention, the display panels each include a display cell, microlenses, and a field lens. The field lens is designed to converge the principal rays passed through the microlenses in parallel with the optical axis onto the eyepiece. Accordingly, the lights exiting the plurality of pixel electrodes in the display cell are each magnified to the size of the pixel so that the edges of the lights just meet each other, thus producing a bright and uniform contrast display. Furthermore, moire patterns formed due to parallax effects are not produced even when a diffused light source is used. This serves to produce a color display with improved image quality.

BRIEF DESCRIPTION OF THE DRAWINGS

Other and further, objects, features, and advantages of the invention will be more explicit from the following detailed description taken with reference to the drawings wherein.

DETAILED DESCRIPTION OF THE PREFERRED EMBODIMENTS

Figure 1:
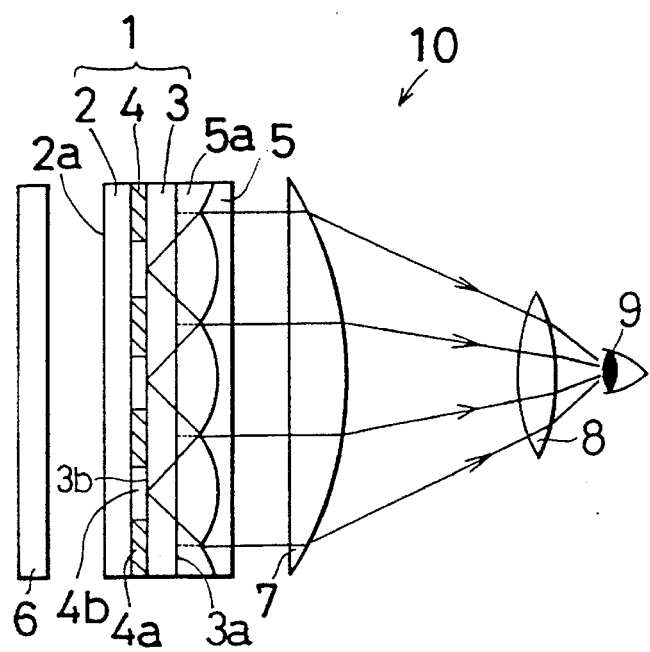
FIG. 1 is a side elevational view diagrammatically showing the construction of a display apparatus 10 according to a first embodiment of the invention.

Now referring to the drawing, preferred embodiments of the invention are described below.

FIG. 1 is a side elevational view diagrammatically showing the construction of a display apparatus 10 according to a first embodiment of the invention. In FIG. 1, light-blocking areas 4a formed by a black matrix 4 that constitutes part of the display apparatus 10 are indicated by oblique hatching for clarity; the same areas are also indicated by oblique hatching in FIGS. 2 and 4 hereinafter given. The display apparatus 10 is a direct-view display which comprises a liquid-crystal panel 1, a microlens array 5, a backlight 6, a field lens 7, and an eyepiece 8.

The liquid-crystal panel 1 includes optically transmissive substrates 2 and 3. On one surface of one of the substrates 2, 3 are formed pixel electrodes arranged in a regular pattern (not shown), bus electrodes for transferring voltages to the pixel electrodes, switching devices such as TFTs for switching the applied voltage between the pixel electrodes and bus electrodes, and the black matrix 4, and on one surface of the other substrate are formed counter electrodes, thus realizing so-called active-matrix driving with the liquid-crystal panel 1. Furthermore, an orientation film for orienting liquid crystal molecules is formed on the surface of each of the substrates 2, 3, and liquid crystals are sandwiched between the orientation films formed on the substrates 2 and 3. As a general knowledge, the word 'pixel' indicates a minimum display unit controlled independently by a display signal supplied from outside to a display device. The liquid crystal panel used in the invention consists of pixel electrodes formed on the inner surface of one of the substrates 2 and 3, counter electrodes formed on the inner surface of the other substrate, orientation films formed on the surface of each of the electrodes and liquid crystals sandwiched between the orientation films. The total sum of thickness of the above components, namely the distance between the inner surface of the two substances is usually within 10 μm; therefore it can be said that pixels are arranged on the inner surface 3b of the substrate 3. The above mentioned contents apply to the other embodiments described hereinafter.

Figure 11:
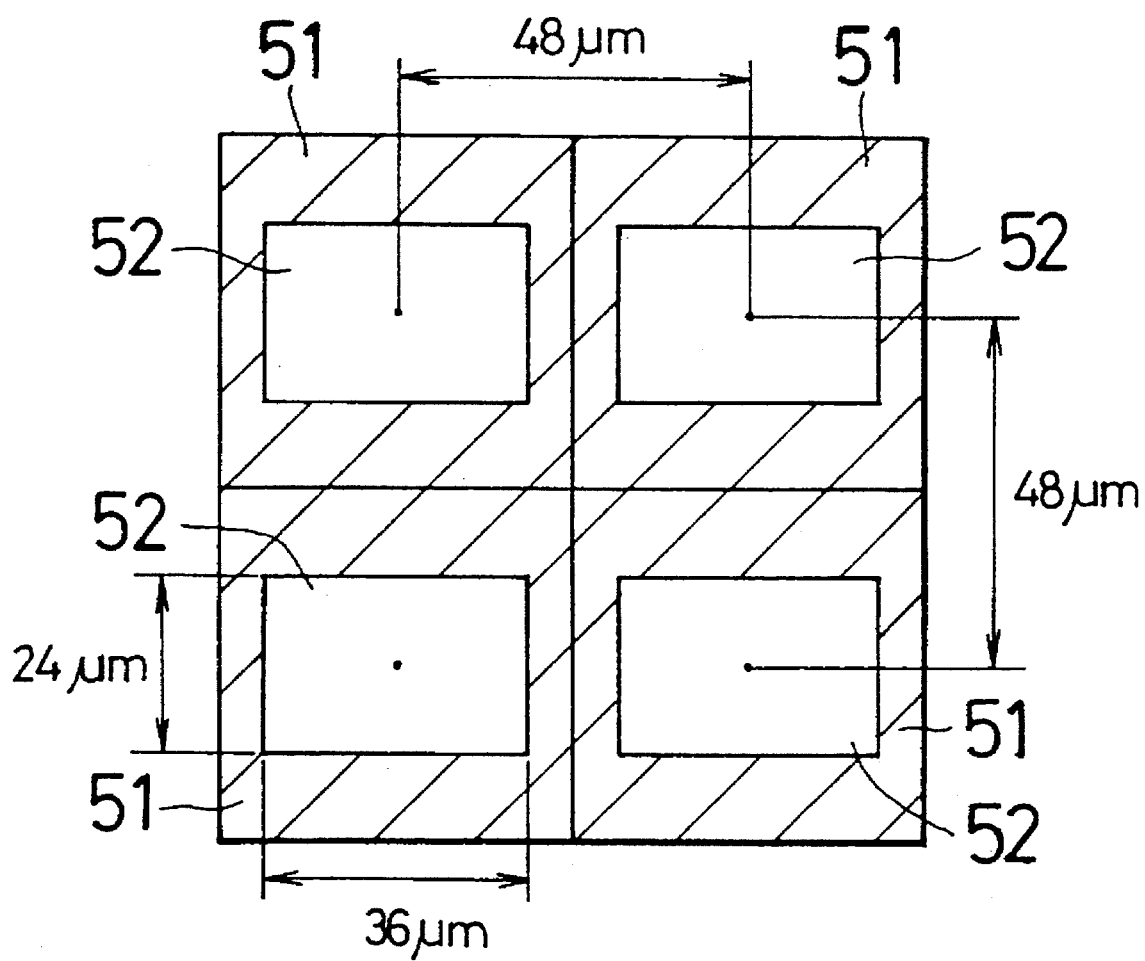
FIG. 11 is a plan view showing the relationship between a pixel 51 and a pixel aperture 52.

The black matrix 4 is provided to block the light passing through those areas of the liquid crystal where the switching devices and the bus electrodes for transferring voltages to the pixel electrodes are formed, and thereby prevent display nonuniformity due to molecular alignment failure in those areas. With the provision of the black matrix 4, a plurality of light-blocking areas 4a indicated by oblique hatching and a plurality of light-transmitting areas 4b are formed. Each pixel electrode is formed in a region including the light-transmitting area 4b. The diagonal length of the thus constructed liquid-crystal panel 1 is selected, for example, as 2 inches (the panel width 40.6 mm and height 30.5 mm). Furthermore, as shown in FIG. 11, the pitch P0 of pixels 51 is selected, for example, as 48 μm in both vertical and horizontal directions, and the size of the pixel aperture 52, i.e. the light-transmitting area 4b, is selected to be 36 μm wide and 24 μm high, for example.

The backlight 6, a diffused light source, is disposed facing the surface 2a of the substrate 2 of the liquid-crystal panel 1. The backlight 6 is constructed from a fluorescent lamp that emits white light. The microlens array 5 is disposed on the outer surface 3a of the substrate 3 of the liquid-crystal panel 1. The microlens array 5 consists of a plurality of microlenses 5a constructed from plano-microlenses arranged orderly in a two-dimensional array, each aligned with one pixel. Each microlens 5a is designed to provide such magnification that the edges of the light exiting the associated light-transmitting area 4b just meet the edges of the light exiting its adjacent light-transmitting areas 4b, thus preventing a stripe pattern from being formed by the presence of the light-blocking areas 4a.

The field lens 7 is disposed on the side of the microlens array 5 nearer to the eyepiece 8. The field lens 7 is so designed that the principal rays passed through the microlens array 5 in parallel with the optical axis are converged onto the eyepiece 8.

In the display apparatus 10, light emitted from the backlight 6 enters the liquid-crystal panel 1. Portions of the light that entered the liquid-crystal panel 1 are blocked by the light-blocking areas 4a. On the other hand, the other portions of the incident light that entered the light-transmitting areas 4b are controlled by the orienting condition of the liquid crystal molecules lying between the substrates 2 and 3. Light exiting each light-transmitting area 4b of the liquid-crystal panel 1 is magnified by its associated microlens 5a so that the edges of the light just meet the edges of the light exiting its adjacent light-transmitting areas 4b. The light passed through the microlens array 5 is bent by the field lens 7 so that the principal rays parallel to the optical axis are converged onto the eyepiece 8. The observer 9 views the light through the eyepiece 8; this means that, of the light exiting the microlens array 5, rays of light allowed to pass through the eyepiece 8, i.e. only the light components parallel to or nearly parallel to the optical axis, enter the eye of the observer 9.

More specifically, the observer 9 observes a certain point on each light-transmitting area 4b of the liquid-crystal panel 1 after that point has been magnified to the size of each microlens 5a. This observed point may be any point on the light-transmitting area 4b. Therefore, the light exiting the microlens array 5 is distributed within a cone of a certain angle from the optical axis.

Figure 2:
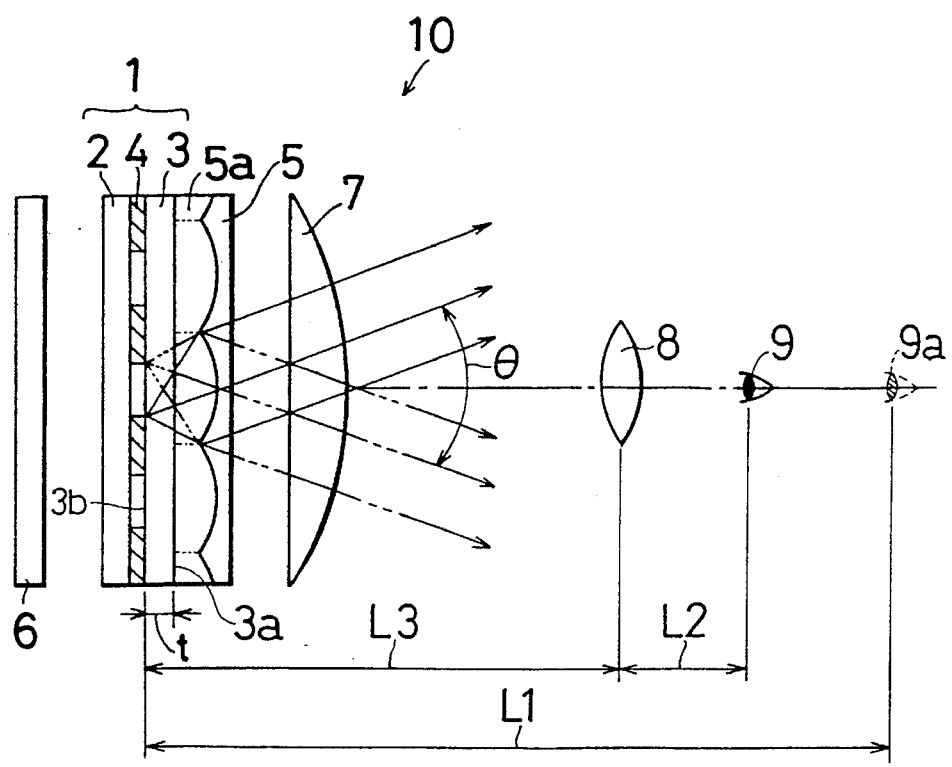
FIG. 2 is a diagram showing a diffusing angle θ of the light emerging from a microlens array 5.

FIG. 2 is a diagram showing a diffusing angle θ of the light exiting the microlens array 5. When the thickness t of the substrate 3, i.e. the distance between the surface 3b of the liquid-crystal panel 1 on which the pixels are arranged and the surface 3a thereof on which the microlenses 5a are arranged, is set at 600 μm, and the refractive index n at 1.52, then the focal length of the microlens 5a is given as 395 μm (=600/1.52), and geometrically, the diffusing angle θ of the pixel aperture is calculated as $2.3°(=2 \cdot \tan^{-1}\{(24/2) / 600\})$ vertically and as $3.4°(=2 \cdot \tan^{-1}\{(36/2) / 600\})$ laterally. When the distance L1 between a virtual image 9a of the observer's pupil 9, when looked through the eyepiece 8 from the liquid-crystal panel 1 side, and the surface 3b of the liquid-crystal panel 1 on which the pixels are arranged is 110 mm, the distance L2 between the eyepiece 8 and the observer's pupil 9 is 20 mm, and the distance L3 between the eyepiece 8 and the surface 3b of the liquid-crystal panel 1 on which the pixels are arranged is 80 mm, then the size of the eye ring at the eyepoint in a viewfinder is geometrically given as 2.9 mm $(=\{20 / (110-80)\} \cdot 2 \cdot 110 \cdot \tan(2.3 / 2)) \times 4.4$ mm $(=\{20 /(110-80)\} \cdot 2 \cdot 110 \cdot \tan(3.4 / 2))$. The eye ring refers to a small, bright circular image formed behind the eyepiece when viewed with the eye moved away from the eyepiece, more specifically to an exit pupil, and the position of this exit pupil is called the eyepoint. The size of the eye ring given above is sufficient for use as a viewfinder.

As described, according to this embodiment, the display apparatus 10 comprises the microlens array 5 and the field lens 7 for converging the principal rays emerging from the microlens array 5 in parallel with the optical axis onto the eyepiece 8. This construction prevents stripe patterns from being formed by the presence of the light-blocking areas 4a, and thus ensures the production of a bright display with uniform contrast. Furthermore, even when the backlight 6 constructed from a diffused light source is used, a moire pattern is prevented from being produced by parallax effects between the liquid-crystal panel 1 and the microlens array 5, and the image quality can be enhanced. Moreover, since the observer 9 views through the eyepiece 8 a magnified image of a point on each light-transmitting area 4b, the effective aperture ratio is improved and a bright display can thus be obtained.

Figure 3:
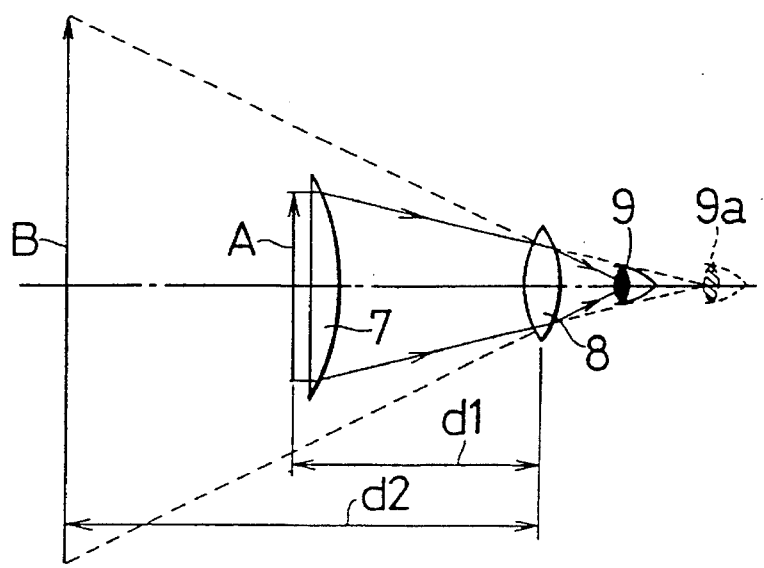
FIG. 3 is a diagram showing a display panel A and a virtual image B of the display panel A.

When the field lens 7 and the eyepiece 8 of the display apparatus 10 are designed according to the purpose, the observer 9 can observe a virtual image of a desired size at a desired point. For example, when the focal length f of the eyepiece 8 is chosen as 60 mm, it can be calculated from the lens focusing formula $(1 / d1)+(1 / d2)=1 / f$ that a display panel A is observed, as shown in FIG. 3, as a virtual image B magnified approximately three times the size of the display panel A, at a distance d2=240 mm from the eyepiece 8. In the above formula, d1 is the distance between the eyepiece 8 and the display panel A. Furthermore, when the field lens 7 and the eyepiece 8 are designed so that the distance d2 from the eyepiece 8 to the virtual image B is 1 meter, a virtual image B magnified approximately 12.5 times can be observed, in which case the apparatus can be used in a head-mounted display for a virtual reality system.

Figure 4:
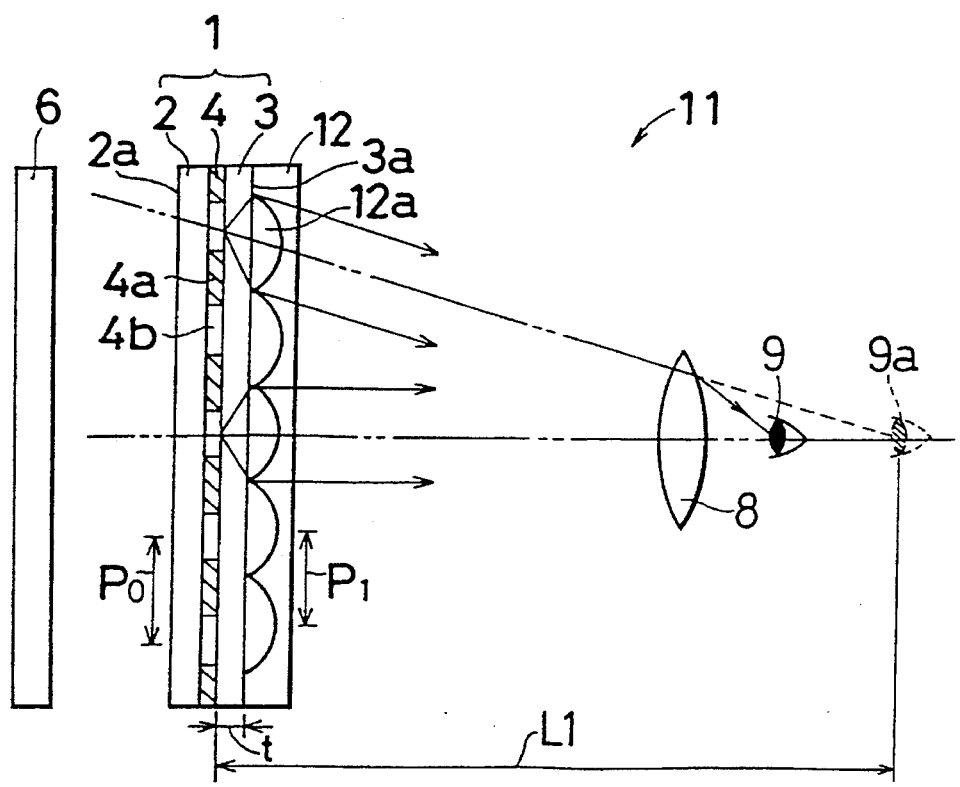
FIG. 4 is a side elevational view diagrammatically showing the construction of a display apparatus 11 according to a second embodiment of the invention.

FIG. 4 is a side elevational view diagrammatically showing the construction of a display apparatus 11 according to a second embodiment of the invention. In this embodiment, correction is made to the pitch P1 of microlenses 12a. The display apparatus 11 is substantially identical in construction to the display apparatus 10, and comprises a liquid-crystal panel 1, a backlight 6, an eyepiece 8, and a microlens array 12 with corrected lens pitch.

The liquid-crystal panel 1 comprises, as in the first embodiment, substrates 2 and 3 sandwiching liquid crystals therebetween and having pixel electrodes and switching devices formed thereon for active matrix driving. A black matrix 4 is formed between the two substrates. The backlight 6 constructed from a diffused light source is disposed facing the surface 2a of the substrate 2 of the liquid-crystal panel 1, while the microlens array 12 is disposed on the surface 3a of the substrate 3 of the liquid-crystal panel 1. The microlens array 12 consists of a plurality of microlenses 12a constructed from plano-microlenses arranged orderly in a two-dimensional array, each aligned with one pixel. Disposed on the side of the microlens array 12 facing the observer 9 is the eyepiece 8. Fitch correction, as described below, is made to the microlenses 12a, and each microlens 12a is designed to provide such magnification that the edges of the light exiting the plurality of light-transmitting areas 4b just meet each other.

When the pixel pitch P0 of the liquid-crystal panel 1 is set at 48 μm, the thickness t of the substrate 3 is set at 600 μm, the refractive index n of the substrate 3 is set at 1.52, and the distance L1 between the virtual image 9a of the observer's pupil 9, when looked through the eyepiece 8 from the liquid-crystal panel 1 side, and the surface of the liquid-crystal panel 1 on which the pixels are arranged is set at 110 mm, then the pitch P1 of the microlenses 12a is given as $P1=P0 \cdot \{(1-t / (n \cdot L1)\}$, from which the pitch P1 of the microlenses 12a is calculated as 47.8 μm, correction thus being made so that the light exiting the liquid-crystal panel 1 passes through the centers of the microlenses 12a.

As described, according to this embodiment, the display apparatus 11 includes the microlens array 12, and the pitch P1 of microlenses 12a in the microlens array 12 is corrected so that the light exiting the liquid-crystal panel 1 passes through the centers of the microlenses 12a. This construction prevents stripe patterns from being formed by the presence of the light-blocking areas 4a, and thus ensures the production of a bright display with uniform contrast. Furthermore, even when the backlight 6 constructed from a diffused light source is used, a moire pattern is prevented from being produced by parallax effects between the liquid-crystal panel 1 and the microlens array 12, and the image quality can be enhanced.

In the first and second embodiments, plano-microlenses are used as the microlenses 5a, 12a, but alternatively, meniscus microlenses, biconvex lenses, or the like, that satisfy the conditions given in the respective embodiments may be used without departing the scope of the invention.

The first and second embodiments have also been described by taking the liquid-crystal panel 1 as an example, but it will be appreciated that a display using an electrochromic panel or light-transmitting ceramics such as PLZT may be used without departing from the scope of the invention.

Figure 5:
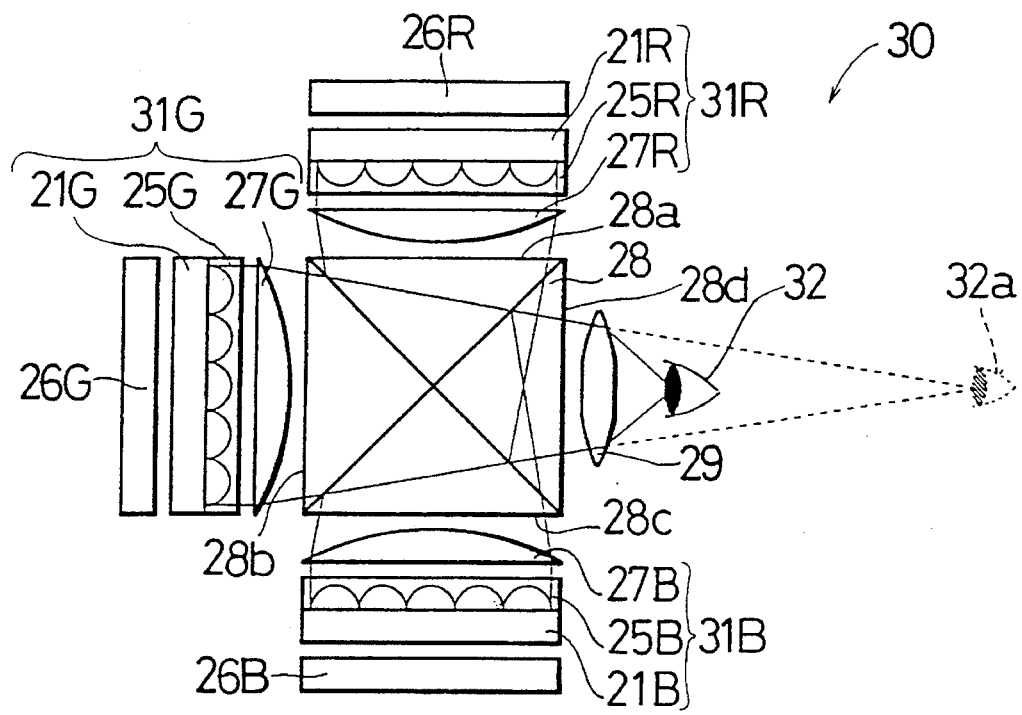
FIG. 5 is a side elevational view diagrammatically showing the construction of a display apparatus 30 according to a third embodiment of the invention.

FIG. 5 is a side elevational view diagrammatically showing the construction of a display apparatus 30 according to a third embodiment of the invention. The display apparatus 30 comprises backlights 26R, 26G, 26B, a crossed dichroic prism 28, an eyepiece 29, and display panels 31R, 31G, 31B. The display panel 31R includes a liquid-crystal cell 21R, a microlens array 25R, and a field lens 27R. Likewise, the display panel 31G includes a liquid-crystal cell 21G, a microlens array 25R, and a field lens 27G, and the display panel 31B includes a liquid-crystal cell 21B, a microlens array 25B, and a field lens 27B.

The crossed dichroic prism 28 as light superimposing means transmits or reflects incident light. Disposed facing the sides 28a, 28b, and 28c of the prism 28 are the display panels 31R, 31G, and 31B, respectively. The backlights 26R, 26G, and 26B, each constructed, for example, from a fluorescent lamp that emits white light, are disposed on the opposite sides of the display panels 31R, 31G, and 31B, respectively, from the sides facing the prism 28. The backlight 26R is provided, for example, with a red color filter, so that light falling in the red wavelength range is radiated from the backlight 26R. Similarly, the backlight 26G is provided, for example, with a green color filter, so that light falling in the green wavelength range is radiated from the backlight 26G. Finally, the backlight 26B is provided, for example, with a blue color filter, so that light falling in the blue wavelength range is radiated from the backlight 26B.

The light radiated from the backlight 26R is passed through the display panel 31R and enters the crossed dichroic prism 28. The crossed dichroic prism 28 reflects the light toward the side 28d of the crossed dichroic prism 28. The light radiated from the backlight 26G is passed through the display panel 31G and enters the crossed dichroic prism 28. The crossed dichroic prism 28 reflects the light toward the side 28d of the crossed dichroic prism 28. The light radiated from the backlight 26B is passed through the display panel 31B and enters the crossed dichroic prism 28. The crossed dichroic prism 28 reflects the light toward the side 28d of the crossed dichroic prism 28. In this manner, the lights entering the crossed dichroic prism 28 from the sides 28a, 28b, and 28c are superimposed and exit from the side 28d. The observer 32 views the superimposed light, i.e. a full-color image, through the eyepiece 29.

Figure 6:
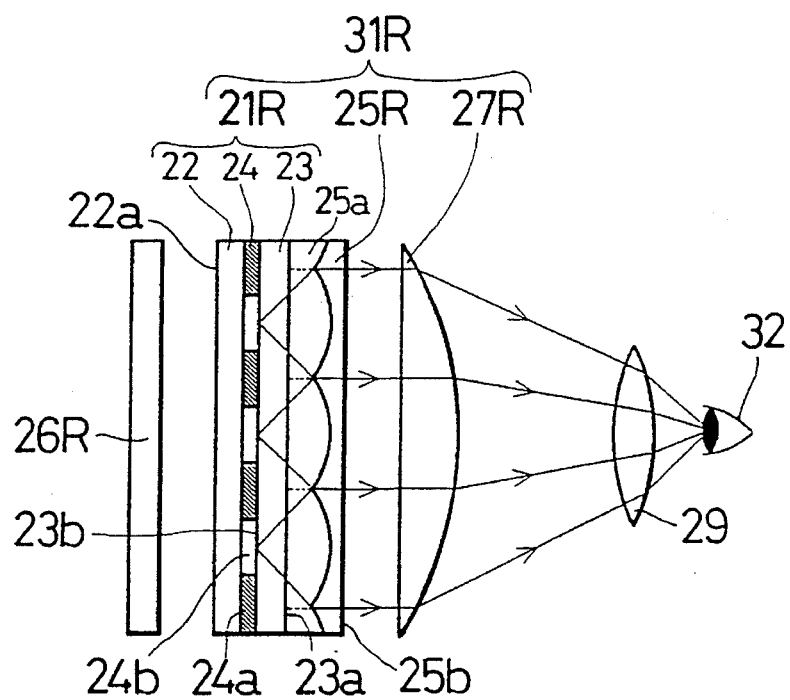
FIG. 6 is a side elevational view showing a display panel 31R of the display apparatus 30.
Figure 7:
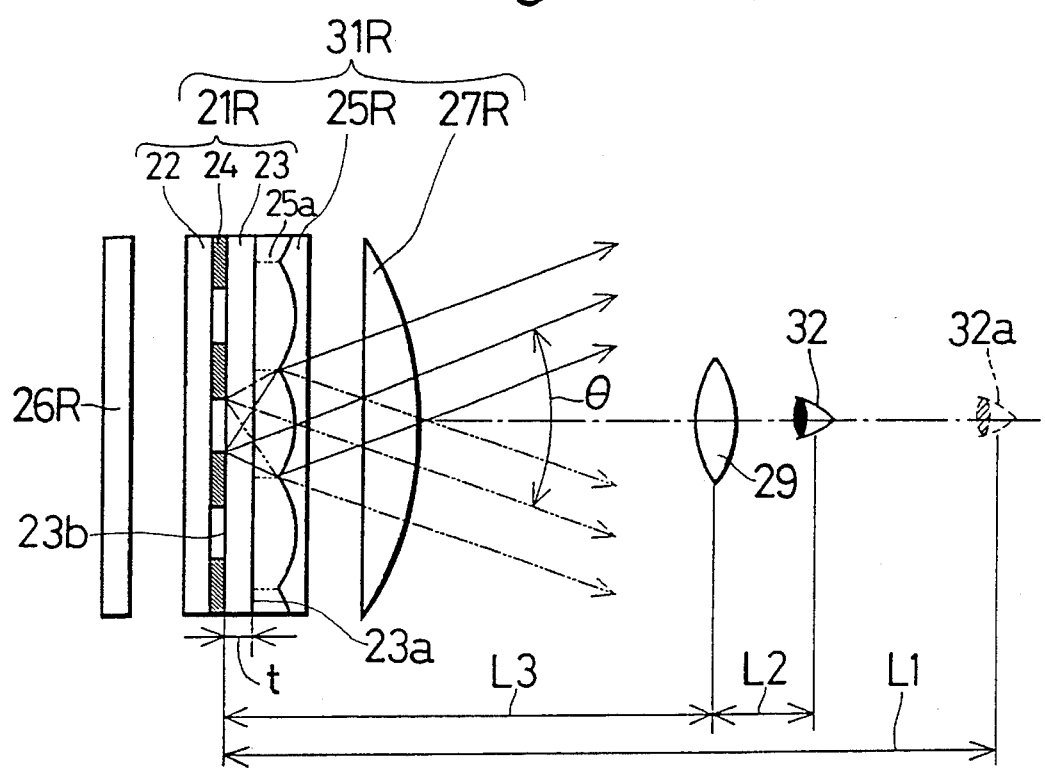
FIG. 7 is a diagram showing a diffusing angle θ of the light emerging from a microlens array 25R.
Figure 10:
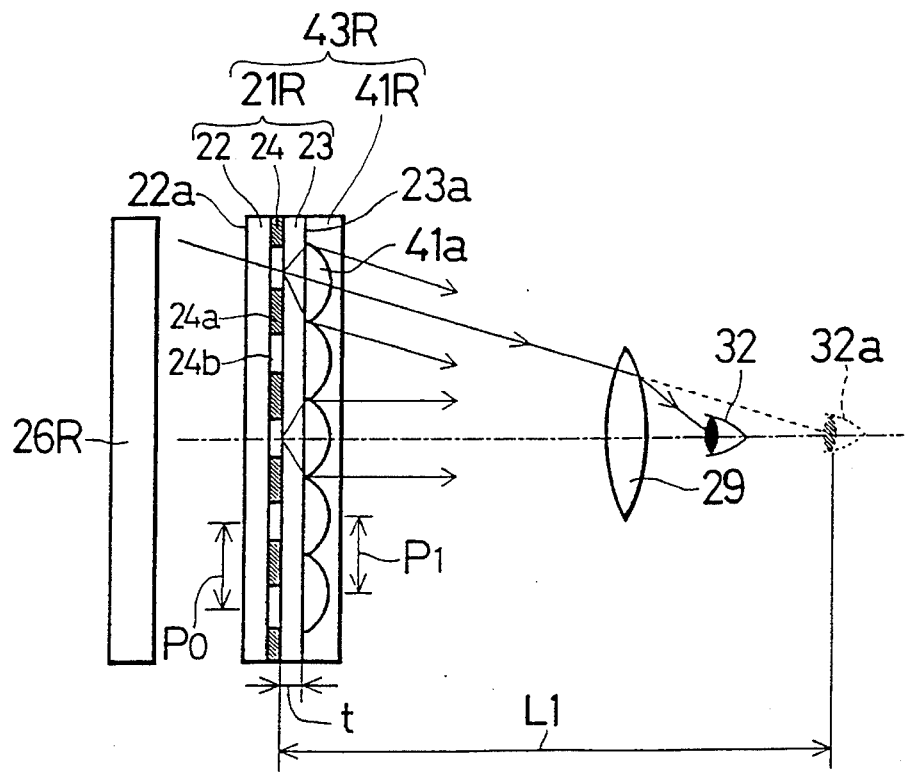
FIG. 10 is a side elevational view showing a display panel 43R of the display apparatus 42.

FIG. 6 is a side elevational view showing the display panel 31R of the display apparatus 30. In FIG. 6, light-blocking areas 24a formed by a black matrix 24 are indicated by oblique hatching. In FIGS. 7 and 10 hereinafter given, the same areas are also indicated by oblique hatching. The liquid-crystal cell 21R of the display panel 31R includes optically transmissive substrates 22 and 23. On one surface of one of the substrates 22, 23 are formed pixel electrodes arranged in a regular pattern (not shown), bus electrodes for transferring voltages to the pixel electrodes, switching devices such as TFTs for switching the applied voltage between the pixel electrodes and bus electrodes, and the black matrix 24, and on one surface of the other substrate are formed counter electrodes, thus realizing so-called active-matrix driving with the liquid-crystal panel 21R. Furthermore, an orientation film for orienting liquid crystal molecules is formed on the surface of each of the substrates 22, 23, and liquid crystals are sandwiched between the orientation films formed on the substrates 22 and 23. The definitions, given in the description of the first embodiment, of the pixel and the surface 23b on which the pixels are arranged are also applied to this embodiment.

The black matrix 24 is provided to block the light passing through those areas of the liquid crystal where the switching devices and the bus electrodes for transferring voltages to the pixel electrodes are formed, and thereby preventing display nonuniformity due to molecular alignment failure in those areas. With the provision of the black matrix 24, a plurality of light-blocking areas 24a indicated by oblique hatching and a plurality of light-transmitting areas 24b are formed. The diagonal length of the thus constructed liquid-crystal panel 21R is selected, for example, as 2 inches (the panel width 40.6 mm and height 30.5 mm). Furthermore, the pixel pitch P0 is selected, for example, as 48 μm in both vertical and horizontal directions, and the size of the pixel aperture, i.e. the light-transmitting area 24b, is selected to be 36 μm wide and 24 μm high, for example.

The backlight 26R is disposed facing the outer surface 22a of the substrate 22 of the liquid-crystal cell 21R. The microlens array 25R is disposed on the outer surface 23a of the substrate 23 of the liquid-crystal cell 21R. The microlens array 25R consists of a plurality of microlenses 25a constructed from plano-microlenses arranged orderly in a two-dimensional array, each aligned with one pixel. Each microlens 25a is designed to provide such magnification that the edges of the light exiting the light-transmitting areas 24b just meet each other, thus preventing stripe patterns from being formed by the presence of the light-blocking areas 24a. The field lens 27R is disposed facing the surface 25b of the microlens array 25R. The field lens 27R is so designed that the principal rays passed through the microlens array 25R in parallel with the optical axis are converged onto the eyepiece 29.

In FIG. 6, the crossed dichroic prism 28 is not shown, but it will be noted that the crossed dichroic prism 28 shown in FIG. 5 is located between the display panel 31R and the eyepiece 29.

Light emitted from the backlight 26R enters the liquid-crystal cell 21R. Portions of the light that entered the liquid-crystal cell 21R are blocked by the light-blocking areas 24a. On the other hand, the other portions of the incident light that entered the light-transmitting areas 24b are controlled by the orienting condition of the liquid crystal molecules lying between the substrates 22 and 23. Light exiting each light-transmitting area 24b of the liquid-crystal cell 21R is magnified by its associated microlens 25a so that the edges of the light just meet the edges of the light exiting its adjacent light-transmitting areas 24b. The light passed through the microlens array 25R is bent by the field lens 27R so that the rays of light parallel to the optical axis are converged onto the eyepiece 29. The observer 32 views the light through the eyepiece 29; this means that, of the light exiting the microlens array 25R, rays of light allowed to pass through the eyepiece 29, i.e. only the light components parallel to or nearly parallel to the optical axis, enter the eye of the observer 32.

More specifically, the observer 32 observes a certain point on each light-transmitting area 24b of the liquid-crystal cell 21R after that point has been magnified to the size of each microlens 25a. This observed point may be any point on the light-transmitting area 24b. Therefore, the light exiting the microlens array 25R is distributed within a scope of a certain angle from the optical axis.

FIG. 7 is a diagram showing a diffusing angle θ of the light exiting the microlens array 25R. When the thickness t of the substrate 23, i.e. the distance between the surface 23b of the liquid-crystal cell 21R on which the pixels are arranged and the surface 23a thereof on which the microlenses 25a are arranged, is set at 600 μm, and the refractive index n at 1.52, then the focal length of the microlens 25a is given as 395 μm (=600/1.52), and geometrically, the diffusing angle θ of the pixel aperture is calculated as 2.3°

($=2 \cdot \tan^{-1}\{(24/2) / 600\}$) vertically and as 3.4° ($=2 \cdot \tan^{-1}\{(36/2) / 600\}$) laterally. When the distance L1 between the position of a virtual image 32a of the observer's pupil 32, when looked through the eyepiece 29 from the liquid-crystal cell 21R side, and the surface 23b of the liquid-crystal cell 21R on which the pixels are arranged is 110 mm, the distance L2 between the eyepiece 29 and the observer's pupil 32 is 20 mm, and the distance L3 between the eyepiece 29 and the surface 23b of the liquid-crystal cell 21R on which the pixels are arranged is 80 mm, then the size of the eye ring at the eyepoint in a viewfinder is geometrically given as 2.9 mm ($=\{20 / (110-80)\} \cdot 2 \cdot 110 \cdot \tan(2.3 / 2)) \times 4.4$ mm ($=\{20 / (110-80)\} \cdot 2 \cdot 110 \cdot \tan(3.4 / 2)$). The eye ring refers to a small, bright circular image formed behind the eyepiece when viewed with the eye moved away from the eyepiece, more specifically to an exit pupil, and the position of this exit pupil is called the eyepoint. The size of the eye ring given above is sufficient for use as a viewfinder.

The above description has dealt with the construction of the display panel 31R, but the display panels 31G and 31B also have the same construction and the display is produced in the same manner as described above. Thus, according to this embodiment, the display panels, 31R, 31G, 31B, respectively comprise the microlens arrays, 25R, 25G, 25B, and the field lenses, 27R, 27G, 27B, for converging the principal rays emerging from the microlens arrays, 25R, 25G, 25B, in parallel with the optical axis onto the eyepiece 29. This construction prevents stripe patterns from being formed by the presence of the light-blocking areas 24a, and thus ensures the production of a bright display with uniform contrast. Furthermore, even when the backlights, 26R, 26G, 26B, constructed from a diffused light source, are used, a moire pattern is prevented from being produced by parallax effects between the liquid-crystal cells, 21R, 21G, 21B, and the microlens arrays, 25R, 25G, 25B, and the image quality can be enhanced. Moreover, since the observer 32 views through the eyepiece 29 a magnified image of a point on each light-transmitting area 24b, the effective aperture ratio is improved and a bright display can be obtained.

Furthermore, since the different colored light radiated from the backlights, 26R, 26G, and 26B, are superimposed by the crossed dichroic prism 28 for color display, no individual pixels are discerned as different colored pixels, unlike the structure in which red, green, and blue color filters are provided on each pixel of the display panel. Therefore, the apparatus can be used as a viewfinder for a video camera, for example. Furthermore, the apparatus is suitable for use as a head-mounted display for a virtual reality system, etc., since high resolution color display can be obtained even when the image is enlarged for viewing.

Figure 8:
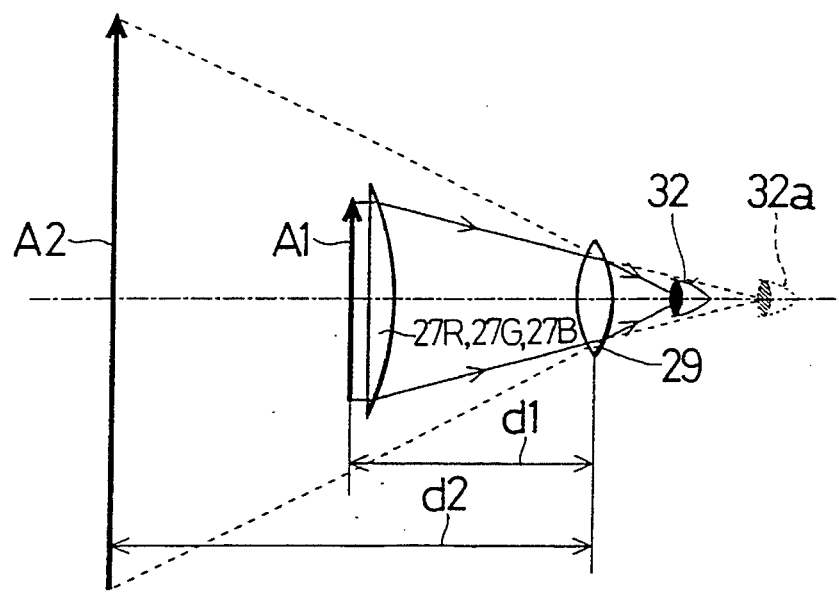
FIG. 8 is a diagram showing a display panel A1 and a virtual image A2 of the display panel A1.

When the field lenses, 27R, 27G, 27B, and the eyepiece 29 of the display apparatus 30 are designed according to the present invention, the observer 32 can observe a virtual image of a desired size at a desired point. For example, when the focal length f of the eyepiece 29 is chosen as 60 ram, it can be calculated from the lens focusing formula $(1 / d1)+(1 / d2)=1 / f$ that a display panel A1 is observed, as shown in FIG. 8, as a virtual image A2 magnified approximately three times the size of the display panel A1, at a distance d2=240 mm from the eyepiece 29. In the above formula, d1 is the distance between the eyepiece 29 and the display panel A1. Furthermore, when the field lenses, 27R, 27G, 27B, and the eyepiece 29 are designed so that the distance d2 from the eyepiece 29 to the virtual image A2 is 1 meter, a virtual image A2 magnified approximately 12.5 times can be observed; the thus designed apparatus can be used with advantage as a head-mounted display for a virtual reality system.

It will also be noted that if a pair of display apparatuses 30 according to the invention are produced and worn for viewing with both eyes, a three-dimensional view having depth can be obtained in such a virtual reality system as mentioned above.

Figure 9:
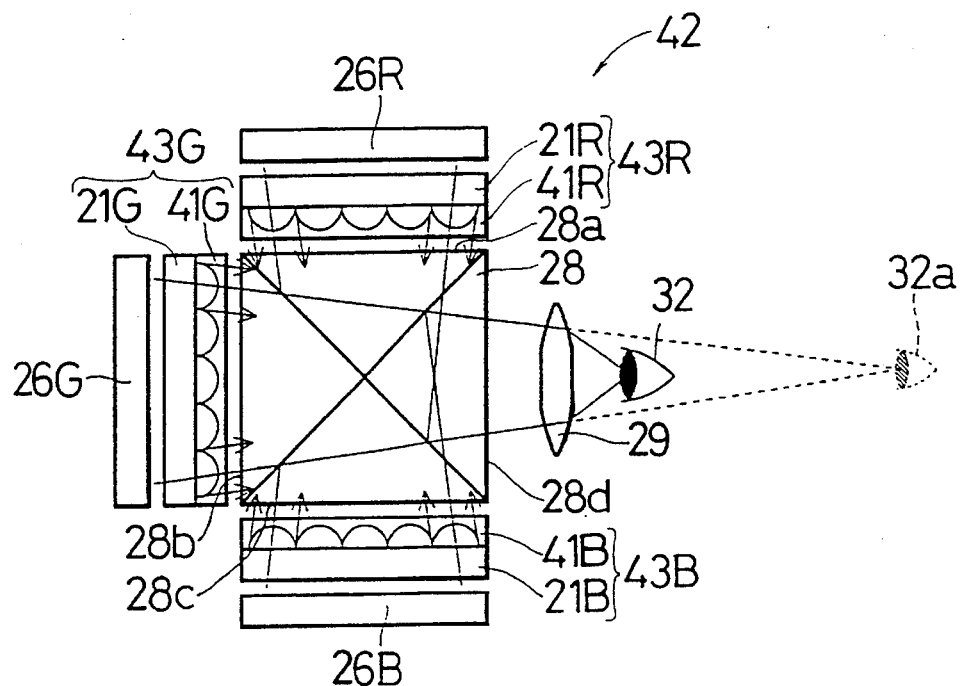
FIG. 9 is a side elevational view diagrammatically showing the construction of a display apparatus 42 according to a fourth embodiment of the invention.

FIG. 9 is a side elevational view diagrammatically showing the construction of a display apparatus 42 according to a fourth embodiment of the invention. The display apparatus 42 is substantially identical in construction to the display apparatus 30 of the foregoing embodiment, except that the display panel 43R consists of a liquid-crystal cell 21R and a microlens array 41R, that the display panel 43G consists of a liquid-crystal cell 21G and a microlens array 41G, and that the display panel 43B consists of a liquid-crystal cell 21B and a microlens array 41B. The microlens arrays, 41R, 41G, and 41B, have corrected pitch P1 of microlenses 41a.

FIG. 10 is a side elevational view showing the display panel 43R of the display apparatus 42. The liquid-crystal cell 21R of the display panel 43R comprises, as in the foregoing embodiment, substrates 22 and 23 sandwiching liquid crystals therebetween and having pixel electrodes and switching devices formed thereon for active matrix driving. A black matrix 24 is formed between the two substrates. The backlight 26R constructed from a diffused light source is disposed facing the surface 22a of the substrate 22 of the liquid-crystal cell 21R, while the microlens array 41R is disposed on the surface 23a of the substrate 23 of the liquid-crystal cell 21R. The microlens array 41R consists of a plurality of microlenses 41a constructed from plano-microlenses each aligned with one pixel. Disposed on the side of the microlens array 41R facing the observer 32 is the eyepiece 29. Pitch correction, as described below, is made to the microlenses 41a of the microlens array 41R, and each microlens 41a is designed to provide such magnification that the edges of the light exiting the plurality of light-transmitting areas 24b just meet each other.

In FIG. 10, as in FIG. 6, the crossed dichroic prism 28 is not shown, but it will be noted that the crossed dichroic prism 28 shown in FIG. 9 is located between the display panel 43R and the eyepiece 29.

When the pixel pitch P0 of the liquid-crystal cell 21R is set at 48 μm, the thickness t of the substrate 23 is set at 600 μm, the refractive index n of the substrate 23 is set at 1.52, and the distance L1 between the position of the virtual image 32a of the observer's pupil 32, when looked through the eyepiece 29 from the liquid-crystal cell 21R side, and the surface of the liquid-crystal cell 21R on which the pixels are arranged is set at 110 mm, then the pitch P1 of the microlenses 41a is given as $P1=P0 \cdot \{(1-t / (n \cdot L1))$, from which the pitch P1 of the microlenses 41a is calculated as 47.8 μm, so that the light exiting the liquid-crystal cell 21R passes through the centers of the microlenses 41a.

The display panels 43G and 43B have the same construction as that of the display panel 43R, and respectively include microlens arrays 41G and 41B with corrected lens pitch. Thus, according to this embodiment, the display panels, 43R, 43G, and 43B, are provided with the microlens arrays, 41R, 41G, and 41B, respectively. The microlens arrays, 41R, 41G, and 41B, consist of microlenses 41a whose pitch is corrected so that the light radiated from the liquid-crystal cells, 21R, 21G, and 21B, passes through the centers of the microlenses 41a. This construction prevents stripe patterns from being formed by the presence of the light-blocking areas 24a, and thus ensures the production of a bright display with uniform contrast. Furthermore, even when the backlights, 26R, 26G, 26B, constructed from a diffused light source, are used, a moire pattern is prevented from being produced by parallax effects between the liquid-crystal cells, 21R, 21G, 21B, and the microlens arrays, 41R, 41G, 41B, and the image quality can be enhanced.

In the display apparatus 42 of this embodiment, as in the display apparatus 30, the different colored light radiated from the backlights, 26R, 26G, 26B, are superimposed by the crossed dichroic prism 28 for color display, and therefore, a high resolution color display can be obtained. Thus, the apparatus of this embodiment is suitable for use as a viewfinder for a video camera or a head-mounted display for a virtual reality system.

It will also be noted that if a pair of display apparatus 42 are produced and worn for viewing with both eyes, a three-dimensional view having depth can be obtained in a virtual reality system, as previously described in connection with the display apparatus 30.

In the third and fourth embodiments, plano-microlenses are used as the microlenses 25a, 41a, but alternatively, meniscus microlenses, biconvex lenses, or the like, that satisfy the conditions given in the respective embodiments may be used without departing the scope of the invention.

The third and fourth embodiments have also been described by taking the liquid-crystal cells, 21R, 21G, and 21B, as an example, but it will be appreciated that a display using an electrochromic panel or light-transmitting ceramics such as PLZT may be used without departing from the scope of the invention.

Furthermore, the third and fourth embodiments have been described based on the structure in which the backlights, 26R, 26G, 26B, are each constructed from a diffused light source, i.e. a cold-cathode tube that emits white light, with red, green, and blue color filters placed on the respective backlights. Alternatively, fluorescent lamps or self-luminous devices such as electroluminescent panels that emit red, green, and blue color lights, respectively, may be used without departing the scope of the invention.

In the third and fourth embodiments, the crossed dichroic prism 28 is used as the light superimposing means, but alternatively, crossed dichroic mirrors or other light superimposing means may be used without departing the scope of the invention.

The invention may be embodied in other specific forms without departing form the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A direct-view display apparatus comprising:

an optically transmissive display panel containing a plurality of pixels, arranged in a matrix array, for controlling light passing therethrough;

a light source for illuminating the display panel;

an eyepiece through which to view the image formed on the display panel; and a plurality of microlenses arranged on the surface of the display panel facing the eyepiece, each microlens being aligned with each individual pixel in the display panel.

2. The direct-view display apparatus as claimed in claim 1, wherein, when the distance between the surface of the display panel on which the pixels are arranged and the surface thereof on which the microlenses are arranged is denoted by t, the distance between a virtual image of an observer's pupil, when looked through the eyepiece from the display panel side, and the surface of the display panel on which the pixels are arranged, is denoted by L1, the refractive index of a substrate of the display panel is denoted by n, the pixel pitch of the display panel is denoted by P0, and the pitch of the microlenses is denoted by P1, then the microlens pitch P1 is given as $P1=P0\cdot\{1-t / (n\cdot L1)\}$.

3. The direct-view display apparatus as claimed in claim 1, where in each microlens is aligned with each individual pixel in the display panel such that edges of light exiting a pixel just meet edges of light exiting adjacent pixels.

4. The direct-view display apparatus as claimed in claim 1, wherein said eyepiece and said plurality of microlenses eliminates moire patterns generated by said optically transmission display panels.

5. The direct-view display apparatus as claimed in claim 1, wherein said eyepiece and said superimposing means are disposed only on a light emitting side of said optically transmission display panel.

6. The direct-view display apparatus as claimed in claim 1, wherein said light source emits diffused light.

7. A direct-view display apparatus comprising;

an optically transmissive display panel containing a plurality of pixels, arranged in a matrix array, for controlling light passing therethrough;

a light source for illuminating the display panel;

an eyepiece through which to view the image formed on the display panel;

a plurality of microlenses are placed on the surface of the display panel facing the eyepiece, each microlens being aligned with each individual pixel in the display panel; and a field lens being placed on the eyepiece side of the microlenses, the field lens converging the principal rays passed through the microlenses in parallel with an optical axis onto the eyepiece.

8. The direct-view display apparatus as claimed in claim 7, where in each microlens is aligned with each individual pixel in the display panel such that edges of light exiting a pixel just meet edges of light exiting adjacent pixels.

9. The direct-view display apparatus as claimed in claim 7, wherein said eyepiece and said plurality of microlenses eliminates moire patterns generated by said optically transmission display panels.

10. The direct-view display apparatus as claimed in claim 7, wherein said eyepiece and said plurality of microlenses are disposed only on a light emitting side of said optically transmission display panel.

11. The direct-view display apparatus as claimed in claim 7, wherein said light source emits diffused light.

12. A direct-view display apparatus comprising:

a plurality of optically transmissive display panels;

a plurality of light sources for illuminating the plurality of display panels, respectively, with different colored light;

superimposing means for optically superimposing the images formed on the plurality of display panels; and an eyepiece through which to view an image superimposed by the superimposing means.

13. The direct-view display apparatus as claimed in claim 12, wherein each display panel comprises:

a display cell in which a plurality of pixels for controlling light passing therethrough are arranged in a matrix array; and a plurality of microlenses arranged in corresponding relationship to the plurality of pixels, the microlenses being arranged on the surface of the display cell facing the superimposing means.

14. The direct-view display apparatus as claimed in claim 13, wherein:

when the distance between the surface of the display cell on which the pixels are arranged and the surface thereof on which the microlenses are arranged is denoted by t, the distance between the surface of the display cell on which the pixels are arranged and an virtual image of an observer's pupil, when looked through the eyepiece from the display cell side, is denoted by L1, the refractive index of a substrate of the display cell is denoted by n, the pixel pitch of the display cell is denoted by P0, and the pitch of the microlenses is denoted by P1, then the microlens pitch P1 is given as $P1 = P0 \cdot \{1 - t / (n \cdot L1)\}$.

15. The direct-view display apparatus as claimed in claim 4 wherein each display panel comprises:

a display cell in which a plurality of pixels for controlling light passing therethrough are arranged in a matrix array;

a plurality of microlenses that are arranged in corresponding relationship to the plurality of pixels, the microlenses being arranged on the surface of the display cell facing the superimposing means; and a field lens for converging the principal rays passed through the microlenses in parallel with an optical axis onto the eyepiece, the field lens, being placed between the microlenses and the superimposing means.

16. The direct-view display apparatus as claimed in claim 12, where in each microlens is aligned with each individual pixel in the display panel such that edges of light exiting a pixel just meet edges of light exiting adjacent pixels.

17. The direct-view display apparatus as claimed in claim 12, wherein said eyepiece and said plurality of microlenses eliminates moire patterns generated by said optically transmission display panels.

18. The direct-view display apparatus as claimed in claim 12, wherein said eyepiece and said superimposing means are disposed only on a light emitting side of said optically transmission display panel.

19. The direct-view display as claimed in claim 12, wherein said plurality of light sources emit diffused light.

* * * * *